(12) United States Patent
Jang et al.

(10) Patent No.: US 9,466,973 B2
(45) Date of Patent: Oct. 11, 2016

(54) OVERLOAD AND SHORT-CIRCUIT SENSING CIRCUIT AND CONVERTER PROTECTING CIRCUIT AND METHOD

(71) Applicant: SAMSUNG ELECTRO-MECHANICS CO., LTD., Suwon-si, Gyeonggi-do (KR)

(72) Inventors: Yu Jin Jang, Suwon-si (KR); Jeong Mo Yang, Suwon-si (KR); Hwan Cho, Suwon-si (KR)

(73) Assignee: SOLUM CO., LTD., Suwon-Si (KR)

( * ) Notice: Subject to any disclaimer, the term of this patent is extended or adjusted under 35 U.S.C. 154(b) by 362 days.

(21) Appl. No.: 14/137,549

(22) Filed: Dec. 20, 2013

(65) Prior Publication Data
US 2014/0177107 A1 Jun. 26, 2014

(30) Foreign Application Priority Data
Dec. 21, 2012 (KR) .......................... 10-2012-0150855

(51) Int. Cl.
*H02H 7/00* (2006.01)
*H02H 9/00* (2006.01)
*H02H 7/12* (2006.01)

(52) U.S. Cl.
CPC ..................... *H02H 7/12* (2013.01)

(58) Field of Classification Search
CPC ............. H02H 3/08; H02H 7/10; H02H 9/04
USPC ........................................... 361/18
See application file for complete search history.

(56) References Cited

U.S. PATENT DOCUMENTS

| 6,347,028 | B1 | 2/2002 | Hausman, Jr. et al. |
| 7,848,124 | B2 | 12/2010 | Choi et al. |
| 2011/0228566 | A1* | 9/2011 | Liang ..................... H02M 1/32 363/21.02 |

* cited by examiner

*Primary Examiner* — Dharti Patel
(74) *Attorney, Agent, or Firm* — McDermott Will & Emery LLP (57) ABSTRACT

Disclosed herein are an overload and short-circuit sensing circuit and a converter protecting circuit and method. The overload and short-circuit sensing circuit includes: an overcurrent sensing unit sensing a primary current of a converter; a voltage level adjusting unit adjusting a voltage level of the sensed primary current; a rectifying unit rectifying the signal adjusted by the voltage level adjusting unit; a short-circuit sensing unit sensing a current induced to a primary side of the converter due to a short-circuit or an overcurrent at a secondary side of the converter, separately from the overcurrent sensing unit; and a delay unit delaying the signal provided from the rectifying unit and the induced current sensing signal provided from the short-circuit sensing unit and providing the delayed signals to a control circuit for protecting the converter.

13 Claims, 5 Drawing Sheets

OVERLOAD AND SHORT-CIRCUIT SENSING CIRCUIT AND CONVERTER PROTECTING CIRCUIT AND METHOD

CROSS REFERENCE(S) TO RELATED APPLICATIONS

This application claims the foreign priority benefit under 35 U.S.C. Section 119 of Korean Application Ser. No. 10-2012-0150855, entitled "Overload and Short-circuit Sensing Circuit and Converter Protecting Circuit and Method" filed on Dec. 21, 2012, which is hereby incorporated by reference in its entirety into this application.

BACKGROUND OF THE INVENTION

1. Technical Field

The present invention relates to an overload and short-circuit sensing circuit and a converter protecting circuit and method. More particularly, the present invention relates to an overload and short-circuit sensing circuit and a converter protecting circuit and method capable of sensing an overcurrent at a primary side and a short-circuit state at a secondary side.

2. Description of the Related Art

Generally, a converter power supplying device, for example, a device to which an LLC switching mode power supply (SMPS) is applied, for example, a television (TV) device, or the like, performs a protecting circuit operation. The protecting circuit operation may be mainly divided into two operations. A first operation is to turn off a device when an external load increases to a predetermined level or more and again normally operate the device when the load decreases to a normal level. When the load is maintained in a high state, the device is repeatedly turned on and off until the load is in the normal state. A second operation is to protect the device when an output of the load is in a short-circuit state. An output of the device is generally transmitted as a connector output to an image board or a liquid crystal display (LCD). Here, in the case in which a short-circuit is generated between pins due to an error of a manufacturing process, a significantly large current may instantaneously flow. When a large current flows for a long period of time, since the device may be damaged, the device should be immediately turned off. At the time of operating the protecting circuit, an abnormal phenomenon such as heat generation, a change in a board color, or the like, should not be generated.

In order to accomplish the protecting circuit function as described above, an overcurrent and short-circuit sensing circuit is required. Describing an LLC resonance control circuit in detail by way of example, a transformer for a direct current (DC)-DC control and an overcurrent sensing circuit sensing a current flowing to a primary side of the transformer are required. An existing overload preventing and short-circuit controlling circuit includes a primary current sensing unit, a half wave rectifier circuit, and a resistance dividing circuit. An amount of current flowing to the primary side is sensed as an alternating current (AC) voltage by a capacitor and is half-wave rectified by a diode. Then, the half-wave rectified voltage is smoothed by a capacitor DC smoothing circuit and is then converted into a voltage capable of comparing with an internal level of a control integrated circuit (IC) by a resistor. At the time of a normal operation, a voltage of a set voltage or less of the control IC is provided to the control IC, such that the control circuit is not operated. Meanwhile, at the time of an overload, as a level rises, the control circuit is operated, and an operation of turning off the device depending on the operation of the control circuit is repeated.

According to the related art, a turn on/off time is controlled by an RC delay of a smoothing capacitor of a level setting resistor, wherein the level setting resistor has a value determined in accord with specifications of devices. Therefore, in order to increase the RC delay, a value of the smoothing capacitor should be set to be significantly large. In order to increase the value of the smoothing capacitor, an electrolytic capacitor is used instead of a multilayered ceramic capacitor mainly used for miniaturization and lightness. Therefore, disadvantages such as a printed circuit board (PCB) area increase, a cost increased, a decrease in a device life due to characteristics of the electrolytic capacitor itself, and the like, are generated. In addition, according to the related art, since a short-circuit situation should also be detected only by an overload detecting circuit, an overload current level and a short-circuit level are not independently controlled. Further, a normal level at which the protecting circuit is operated rises, such that stability of the device is deteriorated.

RELATED ART DOCUMENT

Patent Document (Patent Document 1) US Patent Publication No. U.S. Pat. No. 7,848,124 (published on Dec. 7, 2010)
(Patent Document 2) US Patent Publication No. U.S. Pat. No. 6,347,028 (published on Feb. 12, 2002)

SUMMARY OF THE INVENTION

An object of the present invention is to provide a technology capable of independently controlling an overload current level and a short-circuit level in accord with specifications of each device by separately configuring a circuit path detecting an overcurrent and a circuit path detecting a short-circuit induced current induced to a primary side depending on a short-circuit situation of a secondary side at the primary side.

According to an exemplary embodiment of the present invention, there is provided an overload and short-circuit sensing circuit including: an overcurrent sensing unit sensing a primary current of a converter; a voltage level adjusting unit adjusting a voltage level of the sensed primary current; a rectifying unit rectifying the signal adjusted by the voltage level adjusting unit; a short-circuit sensing unit sensing a current induced to a primary side of the converter due to a short-circuit or an overcurrent at a secondary side of the converter, separately from the overcurrent sensing unit; and a delay unit delaying the signal provided from the rectifying unit and the induced current sensing signal provided from the short-circuit sensing unit and providing the delayed signals to a control circuit for protecting the converter.

The overcurrent sensing unit may include a sensing capacitor connected in parallel with a resonant capacitor configuring a primary resonant circuit of the converter to sense the primary current.

The voltage level adjusting unit may include voltage dividing resistors connected in series with each other between the overcurrent sensing unit and a ground terminal.

The rectifying unit may include a first diode blocking the signal voltage-divided by the voltage level adjusting unit from being leaked to a ground terminal and a second diode rectifying the voltage-divided signal and providing the rectified signal to the delay unit.

The short-circuit sensing unit may include a sensing resistor connected to a rear end of a resonant capacitor configuring a primary resonant circuit of the converter and sensing the current induced to the primary side and a third diode connected in series with the sensing resistor and rectifying the signal sensed by the sensing resistor.

The delay unit may include a delay resistor and a delay capacitor connected in parallel with each other between a ground terminal and a common node among one end of the rectifying unit, one end of the short-circuit sensing unit and an input terminal of the control circuit and provide the delayed signal to the control circuit to control a switch on/off of a control switch of the converter.

The converter may be an LLC resonant converter.

According to another exemplary embodiment of the present invention, there is provided a converter protecting circuit including: an overcurrent sensing unit sensing a primary current of a converter; a voltage level adjusting unit adjusting a voltage level of the sensed primary current; a rectifying unit rectifying the signal adjusted by the voltage level adjusting unit; a short-circuit sensing unit sensing a current induced to a primary side of the converter due to a short-circuit or an overcurrent at a secondary side of the converter, separately from the overcurrent sensing unit; a delay unit delaying the signal provided from the rectifying unit and the induced current sensing signal provided from the short-circuit sensing unit; an overcurrent judging unit receiving the signal from the delay unit, comparing the received signal with a first reference signal, judging whether or not an overcurrent has been generated and outputting a judgment result; a short-circuit judging unit connected in parallel with the overcurrent judging unit, receiving the signal from the delay unit, judging whether or not a short-circuit has been generated and outputting a judgment result; and a protection unit outputting an auto restart signal at the time of the overcurrent and outputting a system protection signal at the time of the short-circuit, depending on the signals output from the overcurrent judging unit and the short-circuit judging unit.

The overcurrent sensing unit may include a sensing capacitor connected in parallel with a resonant capacitor configuring a primary resonant circuit of the converter to sense the primary current, the voltage level adjusting unit may include voltage dividing resistors connected in series with each other between the sensing capacitor and a ground terminal, and the rectifying unit may include a first diode blocking the signal voltage-divided by the voltage diving resistors from being leaked to the ground terminal and a second diode rectifying the voltage-divided signal and providing the rectified signal to the delay unit.

The short-circuit sensing unit may include a sensing resistor connected to a rear end of a resonant capacitor configuring a primary resonant circuit of the converter and sensing the current induced to the primary side and a third diode connected in series with the sensing resistor and rectifying the signal sensed by the sensing resistor.

The delay unit may include a delay resistor and a delay capacitor connected in parallel with each other and have one end connected to a node connected to input terminals of the overcurrent judging unit and the short-circuit judging unit and one ends of the rectifying unit and the short-circuit sensing unit and the other end connected to a ground terminal.

The overcurrent judging unit may include an overcurrent comparator receiving the signal provided from the delay unit at a comparing input terminal thereof, comparing the received signal with the first reference signal, judging whether or not the overcurrent has been generated and outputting the judgment result.

The short-circuit judging unit may include a short-circuit comparator connected in parallel with the overcurrent judging unit, receiving the signal from the delay unit at a comparing input terminal thereof, comparing the received signal with a second reference signal, judging whether or not the short-circuit has been generated and outputting a judgment result and a flip flop receiving an output of the short-circuit comparator as one input and generating an output signal.

The protection unit may include a logic gate receiving the signals output from the overcurrent judging unit and the short-circuit judging unit and a protection signal generating unit outputting a control signal switching on/off a control switch of the converter depending on an output of the logic gate.

The converter may be an LLC resonant converter.

According to still another exemplary embodiment of the present invention, there is provided a converter protecting method including: a sensing, level adjusting and rectifying step of sensing a primary current in order to judge an overcurrent at a primary side of a converter or sensing an induced current induced to the primary side due to a short-circuit or an overcurrent at a secondary side of the converter separately from sensing the primary current, adjusting a voltage level of the primary current sensed at the time of sensing the primary current, and rectifying a signal of which the voltage level is adjusted; a delay step of delaying the signal rectified depending on the sensing of the primary current or the induced current sensed depending on the sensing of the induced current; an overcurrent and short-circuit judging step of receiving the signal provided from the delay step, comparing the received signal with a first reference signal, judging whether or not an overcurrent has been generated and outputting a judgment result, and at the same time, separately, receiving the signal provided from the delay step, judging whether or not a short-circuit has been generated and outputting a judgment result; and a protection signal outputting step of outputting an auto restart signal at the time of the overcurrent and outputting a system protection signal at the time of the short-circuit, depending on the signal output from the overcurrent and short-circuit judging step.

In the sensing, level adjusting and rectifying step, the primary current may be sensed by the sensing capacitor connected in parallel with a resonant capacitor configuring a primary resonant circuit of the converter or the induced current induced to the primary side may be sensed by a sensing resistor connected to a rear end of the resonant capacitor, the voltage level of the primary current sensed at the time of sensing the primary current may be divided by voltage dividing resistors connected in series with each other between the sensing capacitor and a ground terminal, leakage of the signal voltage-divided by the voltage dividing resistors to the ground terminal may be blocked by a first diode, and the signal voltage-divided by the voltage dividing resistors may be rectified by a second diode, and the signal sensed by the sensing resistor at the time of sensing the induced current may be rectified by a third diode connected in series with the sensing resistor.

The overcurrent and short-circuit judging step may include an overcurrent judging step of receiving the signal delayed in the delay step at a comparing input terminal of an overcurrent comparator, comparing the received signal with the first reference signal, judging whether or not the overcurrent has been generated and outputting a judgment result; and a short-circuit judging step of receiving the signal provided from the delay step at a comparing input terminal of a short-circuit comparator connected in parallel with the overcurrent comparator, comparing the received signal with a second reference signal, judging whether or not the short-circuit has been generated and outputting a judgment result, and receiving an output of the short-circuit comparator as one input at a flip flop to generate an output signal.

In the protection signal outputting step, a logic gate may receive the signals output from the overcurrent comparator and the flip flop, and a protection signal generating unit may output a control signal switching on/off a control switch of the converter depending on the output of the logic gate.

The converter may be an LLC resonant converter.

DESCRIPTION OF THE PREFERRED EMBODIMENTS

Exemplary embodiments of the present invention for accomplishing the above-mentioned objects will be described with reference to the accompanying drawings. In the description, the same reference numerals will be used to describe the same components of which a detailed description will be omitted in order to allow those skilled in the art to understand the present invention.

In the specification, it will be understood that unless a term such as 'directly' is not used in a connection, coupling, or disposition relationship between one component and another component, one component may be 'directly connected to', 'directly coupled to' or 'directly disposed to' another element or be connected to, coupled to, or disposed to another element, having the other element intervening therebetween.

Although a singular form is used in the present description, it may include a plural form as long as it is opposite to the concept of the present invention and is not contradictory in view of interpretation or is used as a clearly different meaning. It should be understood that "include", "have", "comprise", "be configured to include", and the like, used in the present description do not exclude presence or addition of one or more other characteristic, component, or a combination thereof.

First, an overload and short-circuit sensing circuit according to an exemplary embodiment of the present invention will be described in detail with reference to the accompanying drawings. In the specification, the same reference numerals will be used in order to describe the same components throughout the accompanying drawings.

Figure 1:
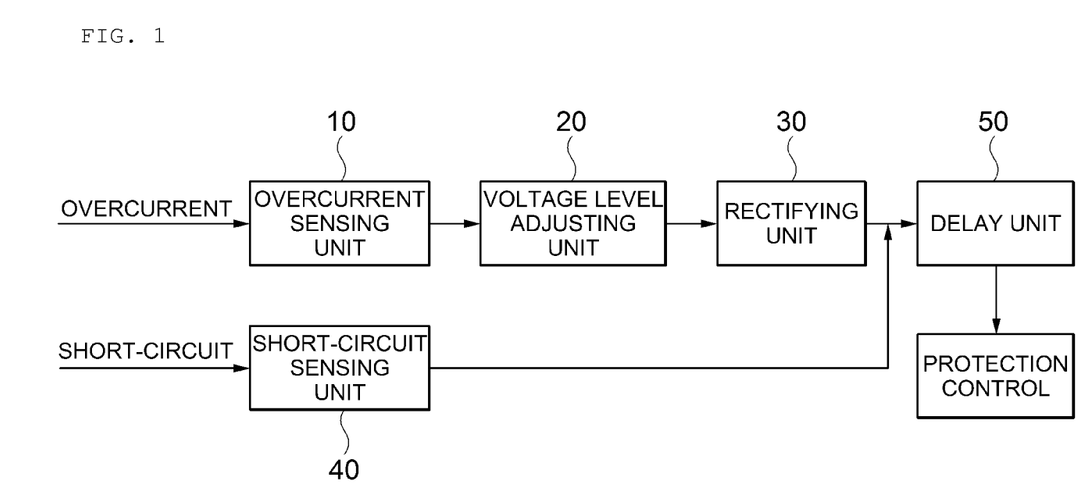
FIG. 1 is a block diagram schematically showing an overload and short-circuit sensing circuit according to an exemplary embodiment of the present invention.

FIG. 1 is a block diagram schematically showing an overload and short-circuit sensing circuit according to an exemplary embodiment of the present invention. In addition, since a converter protecting circuit shown in FIG. 2 includes the overload and short-circuit sensing circuit according to the exemplary embodiment of the present invention, components of FIG. 1 will be described with reference to components of FIG. 2. In addition, a description will also be provided with reference to FIGS. 3 to 5.

Figure 2:
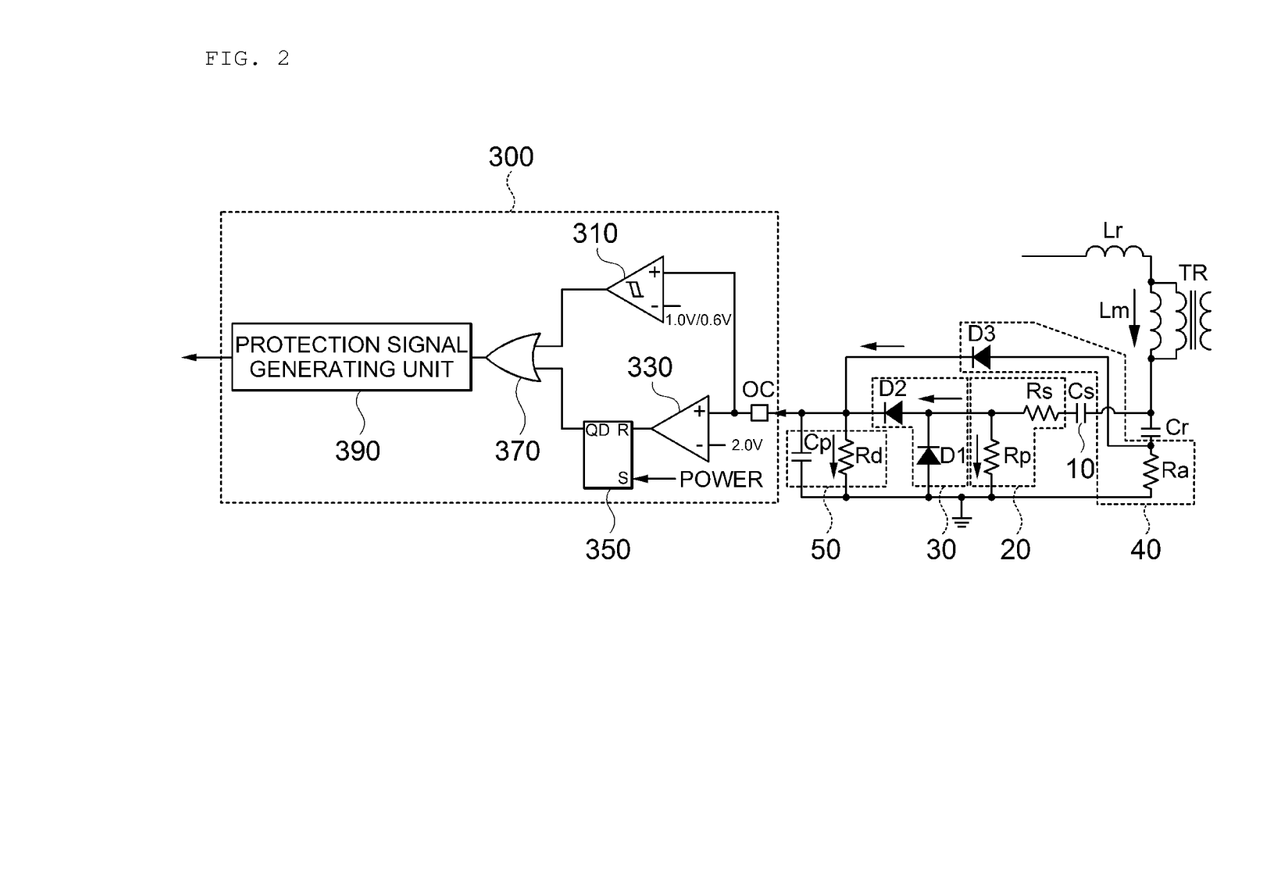
FIG. 2 is a circuit diagram schematically showing a converter protecting circuit according to another exemplary embodiment of the present invention.

Referring to FIGS. 1 and 2, the overload and short-circuit sensing circuit according to the exemplary embodiment of the present invention is configured to include an overcurrent sensing unit 10, a voltage level adjusting unit 20, a rectifying unit 30, a short-circuit sensing unit 40, and a delay unit 50. The overload and short-circuit sensing circuit, which is a circuit of sensing an overcurrent of a converter and a short-circuit at a secondary side of the converter, may have a primary side and the secondary side isolated from each other and be applied to, for example, an LLC resonant converter in which a current is inducted between the primary and second sides. For example, referring to FIG. 2, the overload and short-circuit sensing circuit according to the exemplary embodiment of the present invention may sense an overcurrent at a primary side of the LLC resonant converter and a short-circuit at a secondary side thereof.

First, referring to FIGS. 1 and 2, the overcurrent sensing unit senses a primary current of the converter. For example, the overcurrent sensing unit 10 senses a primary current of the LLC resonant converter.

For example, referring to FIG. 2, the overcurrent sensing unit 10 may include a sensing capacitor Cs. Here, the sensing capacitor Cs may be connected in parallel with a resonant capacitor Cr configuring a primary resonant circuit of the converter to sense the primary current. The sensing capacitor Cs has a capacitance smaller than that of the resonant capacitor Cr. For example, since the resonant capacitor Cr has a capacitance of about 22000 pF and the sensing capacitor Cs has a capacitance of about 100 pF, the resonant capacitor has a capacitance 220 times larger than that of the sensing capacitor. Therefore, the sensing capacitor Cs does not substantially have an effect on a resonant circuit.

Next, referring to FIGS. 1 and 2, the voltage level adjusting unit 20 adjusts a voltage level of the primary current sensed by the overcurrent sensing unit 10. The voltage level adjusting unit 20 is disposed ahead of the rectifying unit 30, such a voltage needs not to be divided using a delay resistor of the delay unit 50 unlike the related art. Therefore, components, for example, a delay resistor and a delay capacitor, of the delay unit 50 may be adjusted in accord with specifications of a converter system. In addition, an overload current level and a short-circuit current level may be conveniently set.

For example, referring to FIG. 2, the voltage level adjusting unit 20 may include voltage dividing resistors. Here, the voltage dividing resistors may be connected in series with each other between the overcurrent sensing unit 10, for example, the sensing capacitor Cs of FIG. 2, and a ground terminal. Referring to FIG. 2, the voltage level adjusting unit 20 is formed so that a resistor Rs and a dividing resistor Rp are connected in series with each other and lowers a voltage level of the primary current sensed by the sensing capacitor Cs in the ratio of Rp/(Rs+Rp). Therefore, magnitudes of the resistor Rs and the dividing resistor Rp are adjusted, such that a voltage may be divided at a magnitude capable of being compared with a first reference signal for judging an overcurrent in a control circuit for protecting the converter.

Next, referring to FIGS. 1 and 2, the rectifying unit 30 rectifies a signal adjusted by the voltage level adjusting unit 20.

For example, referring to FIG. 2, the rectifying unit 30 may include first and second diodes D1 and D2. Here, the first diode D1 may be connected in parallel with the voltage level adjusting unit 20, for example, the dividing resistor Rp of FIG. 2 to block a signal voltage-divided by the dividing resistor Rp from being leaked to the ground terminal. The second diode D2 may be connected in parallel with the first diode D1, forwardly rectify the signal voltage-divided by the voltage level adjusting unit 20, for example, the dividing resistor Rp of FIG. 2, and provide the rectified signal to the delay unit 50. For example, the signal voltage-divided by the voltage level adjusting unit 20, for example, the dividing resistor Rp of FIG. 2 may be an alternating current (AC) signal and may be half wave-rectified using the first and second diodes D1 and D2.

Next, referring to FIGS. 1 and 2, the short-circuit sensing unit 40 senses a current induced to the primary side due to a short-circuit or an overcurrent at the secondary side of the converter. Here, the short-circuit sensing unit 40 senses the current induced to the primary side separately from the overcurrent sensing unit 10. In the exemplary embodiment of the present invention, the short-circuit sensing unit 40 and the overcurrent sensing unit 10 are separately formed, thereby making it possible to independently control an overload current level and a short-circuit current level.

For example, referring to FIG. 2, the short-circuit sensing unit 40 may include a sensing resistor Ra and a third diode D3. Here, the sensing resistor Ra is connected to a rear end of the resonant capacitor Cr configuring the primary resonant circuit of the converter and senses the current induced to the primary side. The third diode D3 may be connected in series with the sensing resistor Ra to rectify a signal sensed by the sensing resistor Ra. For example, as the sensing resistor Ra, a resistor having a very small capacity such as several ten to several hundred mΩ may be used. The sensing resistor Ra has a very small capacity to allow a short-circuit sensing voltage applied to the sensing resistor Ra due to a rapid increase in the current induced to the primary side caused by a short-circuit at the secondary side to exceed a threshold voltage of the third diode D3 and allow a voltage applied to the sensing resistor Ra at the time of a general overcurrent at the primary side to be lower than the threshold voltage of the third diode D3, thereby making it possible to allow a sensed voltage signal not to be conducted through the third diode D3.

Continuously referring to FIGS. 1 and 2, the delay unit 50 delays the signal provided from the rectifying unit 30 and the induced current sensing signal provided from the short-circuit sensing unit 40 and provides the delayed signals to the control circuit 300 for protecting the converter. The control circuit 300 for protecting the converter will be described in detail in a description of a converter protecting circuit according to another exemplary embodiment of the present invention.

For example, referring to FIG. 2, the delay unit 50 may include a delay resistor Rd and a delay capacitor Cp. Here, one ends of the delay resistor Rd and the delay capacitor Cp connected in parallel with each other may be connected to a common node among one end of the rectifying unit 30, one end of the short-circuit sensing unit 40, and an input terminal of the control circuit and the other ends thereof may be connected to the ground terminal. The delay capacitor Cp serves to generate a delay signal depending on discharging and smooth a signal input to the delay unit 50. The delay unit 50 may generate the delay signal by the delay resistor and the delay capacitor connected in parallel with each other and provide the delay signal to the control circuit 300 to control a switch on/off time of a control switch of the converter.

In the exemplary embodiment of the present invention, the short-circuit sensing unit 40 is formed separately from the overcurrent sensing unit 10 and the voltage is divided before rectification, thereby making it possible to independently adjust the delay resistor and the delay capacitor of the delay unit 50 in accord with specifications of the converter.

Figure 3:
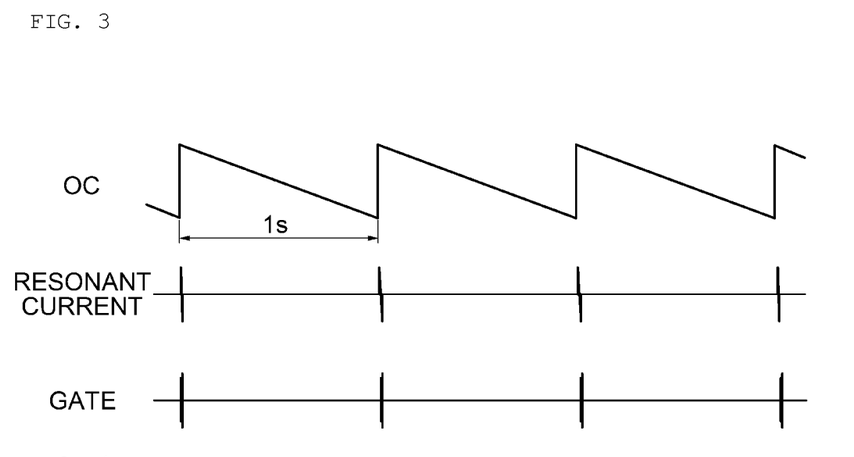
FIG. 3 is a diagram schematically showing an auto restart waveform depending on application of an overload in the converter protecting circuit according to another exemplary embodiment of the present invention.

Referring to FIG. 3, a period of a voltage waveform applied to an input terminal OC of a converter protection control circuit is increased to, for example, 1 s as shown due to a delay by the delay unit 50. Since a delay is generated in a time in which a voltage charged in the delay capacitor of the delay unit 50 is discharged, a switch off time of a converter control switch is increased. As the switch-off time of the converter control switch is increased, in FIG. 3, an interval of a resonant current is increased to increase a conversion period of the converter, such that generation of heat in the converter is decreased. That is, a section in which the resonant current is intermittently operated is increased, such that generation of heat in the LLC resonant converter is decreased at the time of an operation of the converter protecting circuit.

According to the exemplary embodiment of the present invention, in a converter system, for example, an LLC switching mode power supply (SMPS) system, a device may be protected at the time of applying an overload input or secondary short-circuit condition. At the time of applying a secondary short-circuit condition, a primary current amount of the transformer is sensed to operate a protecting circuit. At the time of operating the protecting circuit, a device protecting operation is stably performed through an auto restart or latch operation to perform an effective control so as not to cause damage to a device or a heat generation phenomenon.

According to related art, since a short-circuit situation is detected using an overcurrent detecting circuit, an overload current level and a short-circuit current level are not independently controlled, and a normal level at which a converter protecting circuit is operated rises, such that stability of the system is decreased. To the contrary, according to the exemplary embodiment of the present invention, the short-circuit sensing unit 40 is formed separately from the overcurrent sensing unit 10 and the voltage is divided before rectification, thereby making it possible to freely adjust a short-circuit sensing level and an overcurrent sensing level in accord with specifications of the converter. Further, a normal level at which the converter protecting circuit is operated is independently adjusted, such that stability of the system may be improved. In addition, components, for example, the delay resistor and the delay capacitor, of the delay unit 50 may be independently adjusted in accord with the specifications of the converter, such that the delay unit 50 may be designed in accord with heat specifications of the converter.

Next, a converter protecting circuit according to another exemplary embodiment of the present invention will be described in detail with reference to the accompanying drawings. Hereinafter, a description with be provided with reference to the examples of the overload and short-circuit sensing circuit according to the exemplary embodiment of the present invention described above and FIG. 1. Therefore, an overlapped description will be omitted.

Figure 4:
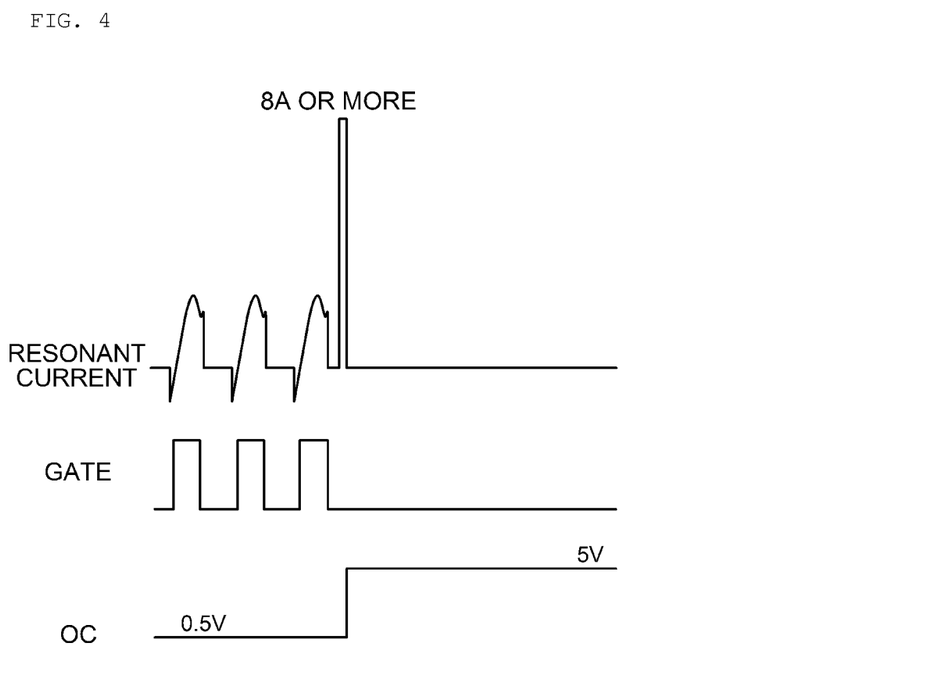
FIG. 4 is a diagram schematically showing a waveform in a short-circuit situation of the converter protecting circuit according to another exemplary embodiment of the present invention.
Figure 5:
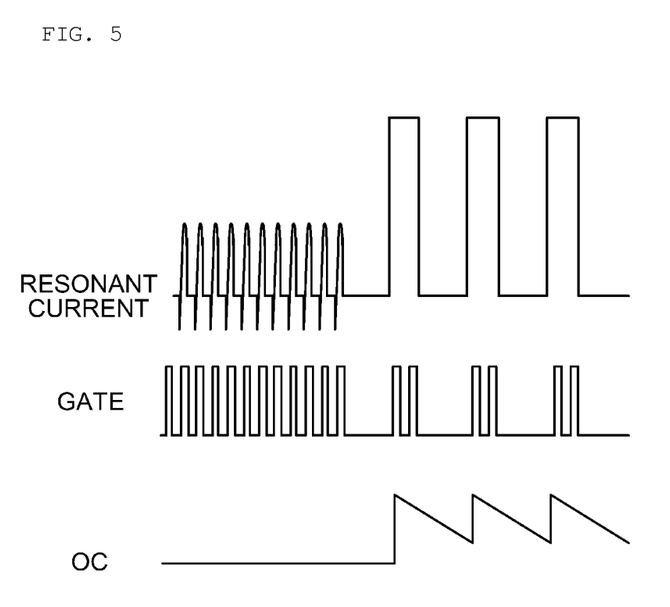
FIG. 5 is a diagram schematically showing another waveform in a short-circuit situation of the converter protecting circuit according to another exemplary embodiment of the present invention.

FIG. 2 is a circuit diagram schematically showing a converter protecting circuit according to another exemplary embodiment of the present invention; FIG. 3 is a diagram schematically showing an auto restart waveform depending on application of an overload in the converter protecting circuit according to another exemplary embodiment of the present invention; FIG. 4 is a diagram schematically showing a waveform in a short-circuit situation of the converter protecting circuit according to another exemplary embodiment of the present invention; and FIG. 5 is a diagram schematically showing another waveform in a short-circuit situation of the converter protecting circuit according to another exemplary embodiment of the present invention.

Referring to FIG. 2, the converter protecting circuit according to another exemplary embodiment of the present invention is configured to include the overcurrent sensing unit 10, the voltage level adjusting unit 20, the rectifying unit 30, the short-circuit sensing unit 40, the delay unit 50, and an overcurrent judging unit 310, a short-circuit judging unit, and a protection unit. A converter to which the converter protecting circuit is applied may be, for example, an LLC resonant converter.

Referring to FIG. 2, the overcurrent sensing unit 10 senses the primary current of the converter. For example, the overcurrent sensing unit 10 may include the sensing capacitor Cs. Here, the sensing capacitor Cs may be connected in parallel with the resonant capacitor Cr configuring the primary resonant circuit of the converter to sense the primary current. For example, the primary current sensed by the overcurrent sensing unit 10 is an AC current.

Next, referring to FIG. 2, the voltage level adjusting unit 20 adjusts the voltage level of the primary current sensed by the overcurrent sensing unit 10. For example, the voltage level adjusting unit 20 includes the voltage dividing resistors connected in series with each other between the sensing capacitor and the ground terminal. For example, referring to FIG. 2, in the case in which the resistor Rs and the dividing resistor Rp are connected in series with each other, the voltage level of the primary current sensed by the sensing capacitor Cs may be decreased in the ratio of Rp/(Rs+Rp).

Next, the rectifying unit 30 rectifies the signal adjusted by the voltage level adjusting unit 20. For example, referring to FIG. 2, the rectifying unit 30 may include the first and second diodes D1 and D2. Here, the first diode D1 blocks the signal voltage-divided by the voltage dividing resistors from being leaked to the ground terminal. In addition, the second diode D2 rectifies the voltage-divided signal and provides the rectified signal to the delay unit 50.

Continuously referring to FIG. 2, the short-circuit sensing unit 40 senses the current induced to the primary side due to the short-circuit or the overcurrent at the secondary side of the converter. Here, the short-circuit sensing unit 40 senses the current induced to the primary side separately from the overcurrent sensing unit 10. For example, referring to FIG. 2, the short-circuit sensing unit 40 may include the sensing resistor Ra and the third diode D3. Here, the sensing resistor Ra is connected to the rear end of the resonant capacitor Cr configuring the primary resonant circuit of the converter and senses the current induced to the primary side. The third diode D3 is connected in series with the sensing resistor Ra to rectify a signal sensed by the sensing resistor Ra.

Next, in FIG. 2, the delay unit 50 delays the signal provided from the rectifying unit 30 and the induced current sensing signal provided from the short-circuit sensing unit 40. For example, the delay unit 50 may include the delay resistor Rd and the delay capacitor Cp connected in parallel with each other. Here, one ends of the delay resistor Rd and the delay capacitor Cp connected in parallel with each other may be connected to a node connected to input terminals of the overcurrent judging unit 310 and the short-circuit judging unit and one ends of the rectifying unit 30 and the short-circuit sensing unit 40, and the other ends thereof may be connected to the ground terminal.

Next, the overcurrent judging unit 310 will be described in detail with reference to FIG. 2. The overcurrent judging unit 310 receives the signal from the delay unit 50, compares the received signal with a first reference signal, judges whether or not an overcurrent has been generated, and outputs a judgment result.

Referring to FIG. 2, the overcurrent judging unit 310 may include an overcurrent comparator. The overcurrent comparator 310 receives the signal provided from the delay unit 50 at a comparing input terminal thereof and compares the signal provided from the delay unit 50 with the first reference signal input to the other input terminal. The overcurrent comparator 310 judges whether or not the overcurrent has been generated depending on the comparison and outputs the judgment result. For example, referring to FIG. 2, the first reference signal may be set to 1.0V, 0.6V, or the like, but is not limited thereto. Here, when a signal larger than the first reference signal is input to the overcurrent comparator due to the overcurrent at the primary side, the overcurrent comparator may output a high signal.

Continuously referring to FIG. 2, the short-circuit judging unit is connected in parallel with the overcurrent judging unit 310. The short-circuit judging unit receives the signal from the delay unit 50, judges whether or not a short-circuit has been generated, and outputs a judgment result.

For example, referring to FIG. 2, the short-circuit judging unit may include a short-circuit comparator 330 and a flip flop 350. Here, the short-circuit comparator 330 is connected in parallel with the overcurrent judging unit 310, receives the signal from the delay unit 50 at a comparing input terminal thereof, and compares the received signal with a second reference signal. The short-circuit comparator 330 judges whether or not the short-circuit has been generated depending on the comparison between the signal provided from the delay unit 50 and the second reference signal and outputs the judgment result. For example, referring to FIG. 2, the second reference signal may be set to 2.0V, but is not limited thereto. Here, when a signal larger than the second reference signal is input to the short-circuit comparator 330 due to the short-circuit at the second side, the short-circuit comparator 330 may output a high signal. In addition, the flip flop 350 receives an output of the short-circuit comparator 330 as one input and generates an output signal. A latch circuit may be used instead of the flip flop 350. The flip flop 350 may be, for example, an RS flip flop. For example, referring to FIG. 2, the flip flop 350 may receive the output of the short-circuit comparator 330 at a reset R thereof, receive a power on signal of the converter system at a set S thereof, and output a signal at a QD terminal depending on a combination of the inputs at R and S.

Next, referring to FIG. 2, the protection unit outputs an auto restart signal at the time of the overcurrent and outputs a system protection signal at the time of the short-circuit, depending on the signals output from the overcurrent judging unit 310 and the short-circuit judging unit.

For example, referring to FIG. 2, the protection unit may include a logic gate 370 and a protection signal generating unit 390. The logic gate 370 receives the signals output from the overcurrent judging unit 310 and the short-circuit judging unit. For example, the logic gate 370 may be an OR gate, but is not limited thereto. The protection signal generating unit 390 outputs a control signal switching on/off the control switch of the converter depending on an output of the logic gate 370.

FIG. 3 shows an auto restart waveform at the time of applying an overload. The longer the period of the auto restart, the small the section in which the overload is applied, such that stress applied to a device is decreased.

FIGS. 4 and 5 shown a short-circuit protection situation. At the time of a short-circuit of a secondary circuit, an amount of current induced to the primary side of the transformer is converted into a voltage by a resistance value of the sensing resistor Ra, thereby making it possible to sense a short-circuit state. In this case, an auto restart or latch operation depending on the resistance value may be determined depending on specifications of the device.

More specifically, FIG. 4 shows an example in which a sensed value of an amount of current induced to the primary side at the time of the short-circuit at the secondary side is 8A or more. For example, a primary voltage is 400V (PFC voltage) and 13V, 60V, or the like, is output at an output of the secondary side using the primary voltage. There may be several cases in which the converter is short-circuited. Among them, in the case in which the primary side of the transformer is short-circuited, the largest current is generated. The case in which the primary side of the transformer is short-circuited is very rare. In this case, a voltage is high, such that a very large current flows through a magnetization inductor Lm and the resonant capacitor Cr of FIG. 2. At the same time, a voltage sensed by the sensing resistor Ra is very large, such that a reference voltage of the short-circuit comparator 330 is sensed to be, for example, 2V or more. In this case, as shown in FIG. 4, the device may be protected in a latch mode, for example, using the flip flop 350. Meanwhile, in the case in which the secondary circuit of the transformer is short-circuited, a relatively small current flows and an auto restart operation is performed. Then, when the short-circuit situation of the device is released, a normal converter operation is performed. This case is shown in FIG. 5.

According to the exemplary embodiment of the present invention, unlike an overload control circuit according to the related art, a time control of an auto restart circuit is freely changed, thereby making it possible to prevent a heat generation problem of the device at the time of an operation of the protecting circuit. In addition, according to the exemplary embodiment of the present invention, a circuit path sensing a short-circuit state is separated from an overload control circuit, thereby making it possible to independently set a level of the overload control circuit and a short-circuit sensing level. Therefore, desired specifications may be more accurately reflected in each device as compared with the related art, and levels may be conveniently set.

Next, a converter protecting method according to still another exemplary embodiment of the present invention will be described in detail with reference to the accompanying drawings. Hereinafter, a description with be provided with reference to the examples of the overload and short-circuit sensing circuit according to the exemplary embodiment of the present invention described above, the examples of the converter protecting circuit according to another exemplary embodiment of the present invention described above, and FIGS. 1 to 5. Therefore, an overlapped description will be omitted.

Figure 6:
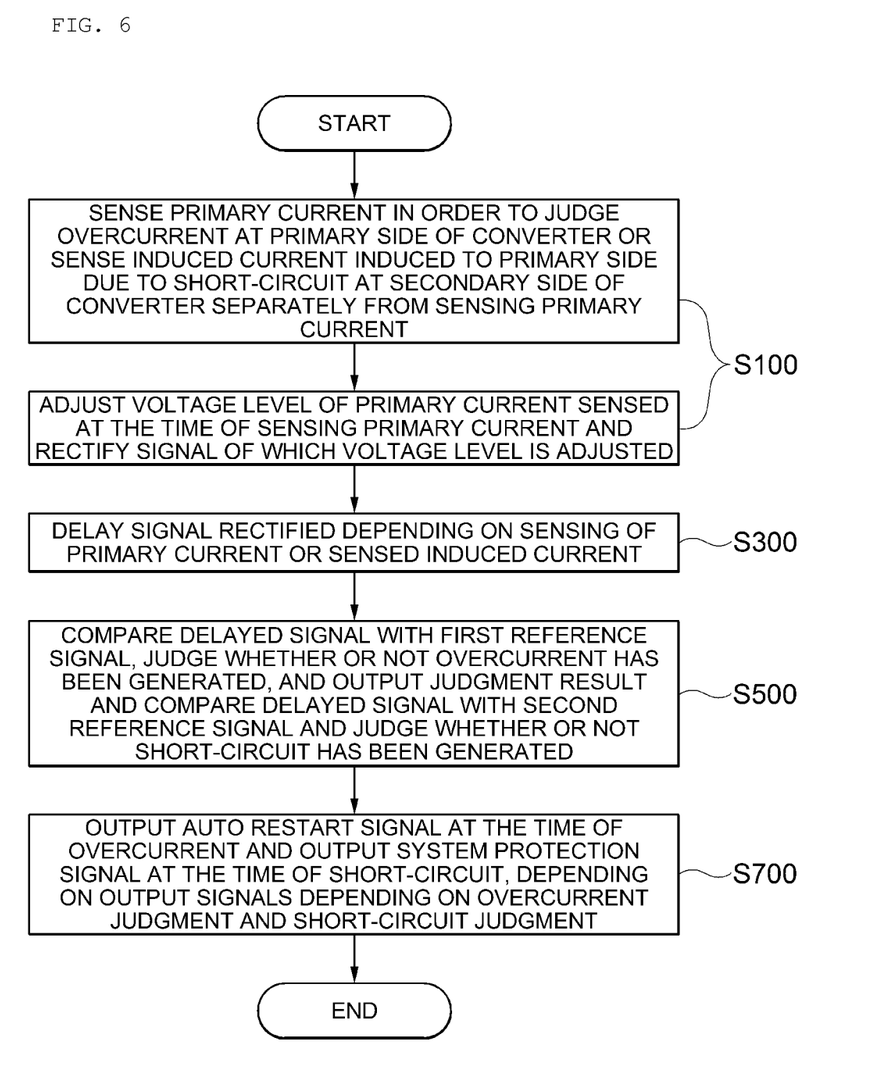
FIG. 6 is a flow chart schematically showing a converter protecting method according to still another exemplary embodiment of the present invention.

FIG. 6 is a flow chart schematically showing a converter protecting method according to still another exemplary embodiment of the present invention.

Referring to FIG. 6, the converter protecting method according to still another exemplary embodiment of the present invention may include a sensing, level adjusting and rectifying step (S100), a delaying step (S300), an overcurrent and short-circuit judging step (S500), and a protection signal outputting step (S700). The converter protecting method according to still another exemplary embodiment of the present invention may be applied to the LLC resonant converter.

Hereinafter, a detailed description will be provided. Here, a description will be provided with reference to the circuit of FIG. 2. First, referring to FIG. 6, in the sensing, level adjusting and rectifying step (S100), a primary current is sensed in order to judge an overcurrent at a primary side of a converter, or an induced current induced to the primary side due to a short-circuit or an overcurrent at a secondary side of the converter is sensed separately from sensing the primary current. For example, referring to FIG. 2, the primary current may be sensed by the overcurrent sensing unit 10, and the induced current may be sensed by the short-circuit sensing unit 40.

For example, referring to FIG. 2, in the sensing, level adjusting and rectifying step (S100), the primary current may be sensed by the sensing capacitor Cs connected in parallel with the resonant capacitor Cr configuring the primary resonant circuit of the converter. Further, in the sensing, level adjusting and rectifying step (S100), the induced current induced to the primary side may be sensed by the sensing resistor Ra connected to the rear end of the resonant capacitor Cr.

Further, in the sensing, level adjusting and rectifying step (S100), a voltage level of the primary current sensed at the time of sensing the primary current is adjusted, and a signal of which the voltage level is adjusted is rectified. For example, referring to FIG. 2, the voltage level of the primary current may be adjusted by the voltage level adjusting unit 20, and the signal of which the voltage level is adjusted may be rectified by the rectifying unit 30.

Referring to FIG. 2, in one example, in the sensing, level adjusting and rectifying step (S100), the voltage level of the primary current sensed at the time of sensing the primary current may be divided by the voltage dividing resistors connected in series with each other between the sensing capacitor Cs and the ground terminal. Further, in the sensing, level adjusting and rectifying step (S100), leakage of the signal voltage-divided by the voltage dividing resistors to the ground terminal may be blocked by the first diode D1, and the signal voltage-divided by the voltage dividing resistors may be rectified by the second diode D2.

In addition, referring to FIG. 2, in the sensing, level adjusting and rectifying step (S100), the signal sensed by the sensing resistor Ra at the time of sensing the induced current may be rectified by the third diode D3 connected in series with the sensing resistor Ra.

Next, referring to FIG. 6, in the delay step (S300), the signal rectified depending on the sensing of the primary current or the induced current sensed depending on the sensing of the induced current is delayed. For example, referring to FIG. 2, the signal rectified depending on the sensing of the primary current or the induced current sensed depending on the sensing of the induced current is delayed by the delay unit 50 including the delay resistor Rd and the delay capacitor Cp connected in parallel with each other. The delayed signal is provided to the subsequent overcurrent and short-circuit judging step (S500).

Next, referring to FIG. 6, in the overcurrent and short-circuit judging step (S500), the signal provided from the delay step (S300) is received and compared with the first reference signal, whether or not the overcurrent has been generated is judged, and a judgment result is output. At the same time, separately, the signal provided from the delay step (S300) is received, whether or not the short-circuit has been generated is judged, and a judgment result is output. For example, referring to FIG. 2, comparison between the delayed signal and the first reference signal and judgment of whether or not the overcurrent has been generated in the overcurrent and short-circuit judging step (S500) may be performed by the overcurrent judging unit 310, for example, the overcurrent comparator. In addition, judgment of whether or not the short-circuit has been generated in the overcurrent and short-circuit judging step (S500) may be performed by the short-circuit judging unit, for example, the short-circuit comparator 330 and the flip flop 350 of FIG. 2.

For example, although not directly shown, referring to FIG. 2, the overcurrent and short-circuit judging step (S500) may include an overcurrent judging step and a short-circuit judging step. Here, the overcurrent judging step and the short-circuit judging step are simultaneously performed. In the overcurrent judging step, the signal delayed in the delay step (S300) is received at a comparing input terminal of the overcurrent comparator, is compared with the first reference signal, whether or not the overcurrent has been generated is judged, and a judgment result is output. In addition, in the short-circuit judging step, the signal provided from the delay step (S300) is received at a comparing input terminal of the short-circuit comparator 330 connected in parallel with the overcurrent comparator, is compared with the second reference signal, whether or not the short-circuit has been generated is judged, and a judgment result is output. Further, in the short-circuit judging step, an output of the short-circuit comparator 330 is received as one input at the flip flop 350 to generate an output signal.

Continuously referring to FIG. 6, in the protection signal outputting step (S700), the auto restart signal is output at the time of the overcurrent and the system protection signal is output at the time of the short-circuit, depending on the signal output from the overcurrent and short-circuit judging step (S500).

For example, referring to FIG. 2, in the protection signal outputting step (S700), the logic gate 370 may receive the signals output from the overcurrent comparator and the flip flop 350, and the protection signal generating unit 390 may output a control signal switching on/off the control switch of the converter depending on the output of the logic gate 370.

According to the exemplary embodiment of the present invention, it is possible to independently control an overload current level and a short-circuit level in accord with specifications of each device by separately configuring a circuit path detecting an overcurrent and a circuit path detecting a short-circuit induced current induced to a primary side depending on a short-circuit situation of a secondary side at the primary side.

In addition, according to the exemplary embodiment of the present invention, unlike an overload control circuit according to the related art, a time control of an auto restart circuit is freely changed, thereby making it possible to prevent a heat generation problem of the device at the time of an operation of the protecting circuit.

Further, according to the exemplary embodiment of the present invention, a circuit path sensing a short-circuit state is separated from an overload control circuit, thereby making it possible to independently set an overload control circuit level and a short-circuit level. Therefore, desired specifications may be more accurately reflected in each device, and levels may be conveniently set.

It is obvious that various effects that are not directly stated according to various exemplary embodiments of the present invention may be derived by those skilled in the art from various configurations according to the exemplary embodiments of the present invention.

The accompanying drawings and the above-mentioned exemplary embodiments have been illustratively provided in order to assist in the understanding of those skilled in the art to which the present invention pertains rather than limiting a scope of the present invention. In addition, exemplary embodiments according to a combination of the above-mentioned configurations may be obviously implemented by those skilled in the art. Therefore, various exemplary embodiments of the present invention may be implemented in modified forms without departing from an essential feature of the present invention. In addition, a scope of the present invention should be interpreted according to claims and includes various modifications, alterations, and equivalences made by those skilled in the art.

What is claimed is:

1. A converter protecting circuit comprising:
   an overcurrent sensing unit sensing a primary current of a converter;
   a voltage level adjusting unit adjusting a voltage level of the sensed primary current;
   a rectifying unit rectifying the signal adjusted by the voltage level adjusting unit;
   a short-circuit sensing unit sensing a current induced to a primary side of the converter due to a short-circuit or an overcurrent at a secondary side of the converter, separately from the overcurrent sensing unit;
   a delay unit delaying the signal provided from the rectifying unit and the induced current sensing signal provided from the short-circuit sensing unit;
   an overcurrent judging unit receiving the signal from the delay unit, comparing the received signal with a first reference signal, judging whether or not an overcurrent has been generated and outputting a judgment result;
   a short-circuit judging unit connected in parallel with the overcurrent judging unit, receiving the signal from the delay unit, judging whether or not a short-circuit has been generated and outputting a judgment result; and
   a protection unit outputting an auto restart signal at the time of the overcurrent and outputting a system protection signal at the time of the short-circuit, depending on the signals output from the overcurrent judging unit and the short-circuit judging unit.

2. The converter protecting circuit according to claim 1, wherein the overcurrent sensing unit includes a sensing capacitor connected in parallel with a resonant capacitor configuring a primary resonant circuit of the converter to sense the primary current,
   the voltage level adjusting unit includes voltage dividing resistors connected in series with each other between the sensing capacitor and a ground terminal, and
   the rectifying unit includes a first diode blocking the signal voltage-divided by the voltage diving resistors from being leaked to the ground terminal and a second diode rectifying the voltage-divided signal and providing the rectified signal to the delay unit.

3. The converter protecting circuit according to claim 1, wherein the short-circuit sensing unit includes a sensing resistor connected to a rear end of a resonant capacitor configuring a primary resonant circuit of the converter and sensing the current induced to the primary side and a third diode connected in series with the sensing resistor and rectifying the signal sensed by the sensing resistor.

4. The converter protecting circuit according to claim 1, wherein the delay unit includes a delay resistor and a delay capacitor connected in parallel with each other and has one end connected to a node connected to input terminals of the overcurrent judging unit and the short-circuit judging unit and one ends of the rectifying unit and the short-circuit sensing unit and the other end connected to a ground terminal.

5. The converter protecting circuit according to claim 1, wherein the overcurrent judging unit includes an overcurrent comparator receiving the signal provided from the delay unit at a comparing input terminal thereof, comparing the received signal with the first reference signal, judging whether or not the overcurrent has been generated and outputting the judgment result.

6. The converter protecting circuit according to claim 1, wherein the short-circuit judging unit includes a short-circuit comparator connected in parallel with the overcurrent judging unit, receiving the signal from the delay unit at a comparing input terminal thereof, comparing the received signal with a second reference signal, judging whether or not the short-circuit has been generated and outputting a judgment result and a flip flop receiving an output of the short-circuit comparator as one input and generating an output signal.

7. The converter protecting circuit according to claim 1, wherein the protection unit includes a logic gate receiving the signals output from the overcurrent judging unit and the short-circuit judging unit and a protection signal generating unit outputting a control signal switching on/off a control switch of the converter depending on an output of the logic gate.

8. The converter protecting circuit according to claim 1, wherein the converter is an LLC resonant converter.

9. A converter protecting method comprising:
a sensing, level adjusting and rectifying step of sensing a primary current in order to judge an overcurrent at a primary side of a converter or sensing an induced current induced to the primary side due to a short-circuit or an overcurrent at a secondary side of the converter separately from sensing the primary current, adjusting a voltage level of the primary current sensed at the time of sensing the primary current, and rectifying a signal of which the voltage level is adjusted;
a delay step of delaying the signal rectified depending on the sensing of the primary current or the induced current sensed depending on the sensing of the induced current;
an overcurrent and short-circuit judging step of receiving the signal provided from the delay step, comparing the received signal with a first reference signal, judging whether or not an overcurrent has been generated and outputting a judgment result, and at the same time, separately, receiving the signal provided from the delay step, judging whether or not a short-circuit has been generated and outputting a judgment result; and
a protection signal outputting step of outputting an auto restart signal at the time of the overcurrent and outputting a system protection signal at the time of the short-circuit, depending on the signal output from the overcurrent and short-circuit judging step.

10. The converter protecting method according to claim 9, wherein in the sensing, level adjusting and rectifying step,
the primary current is sensed by the sensing capacitor connected in parallel with a resonant capacitor configuring a primary resonant circuit of the converter or the induced current induced to the primary side is sensed by a sensing resistor connected to a rear end of the resonant capacitor,
the voltage level of the primary current sensed at the time of sensing the primary current is divided by voltage dividing resistors connected in series with each other between the sensing capacitor and a ground terminal,
leakage of the signal voltage-divided by the voltage dividing resistors to the ground terminal is blocked by a first diode, and the signal voltage-divided by the voltage dividing resistors is rectified by a second diode, and
the signal sensed by the sensing resistor at the time of sensing the induced current is rectified by a third diode connected in series with the sensing resistor.

11. The converter protecting method according to claim 9, wherein the overcurrent and short-circuit judging step includes an overcurrent judging step of receiving the signal delayed in the delay step at a comparing input terminal of an overcurrent comparator, comparing the received signal with the first reference signal, judging whether or not the overcurrent has been generated and outputting a judgment result; and a short-circuit judging step of receiving the signal provided from the delay step at a comparing input terminal of a short-circuit comparator connected in parallel with the overcurrent comparator, comparing the received signal with a second reference signal, judging whether or not the short-circuit has been generated and outputting a judgment result, and receiving an output of the short-circuit comparator as one input at a flip flop to generate an output signal.

12. The converter protecting method according to claim 9, wherein in the protection signal outputting step, a logic gate receives the signals output from the overcurrent comparator and the flip flop, and a protection signal generating unit outputs a control signal switching on/off a control switch of the converter depending on the output of the logic gate.

13. The converter protecting method according to claim 9, wherein the converter is an LLC resonant converter.

* * * * *